March 16, 1971      L. A. TURZILLO      3,570,254
METHOD AND MEANS FOR PROTECTING AN EARTH SURFACE AGAINST SCOUR
Filed Jan. 17, 1969      7 Sheets-Sheet 1
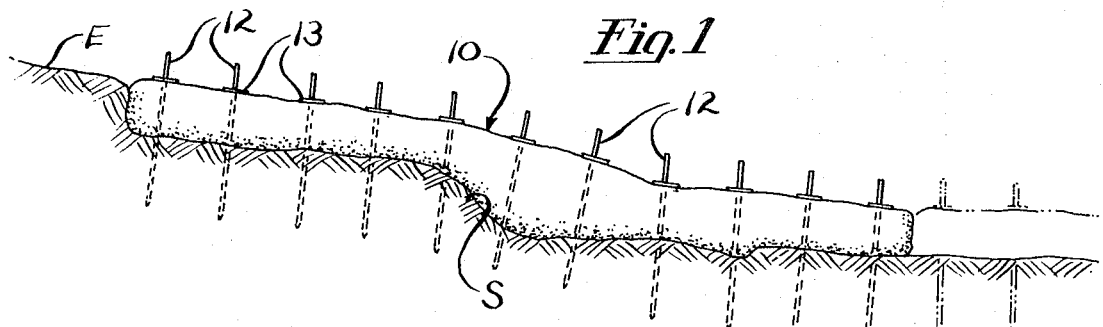
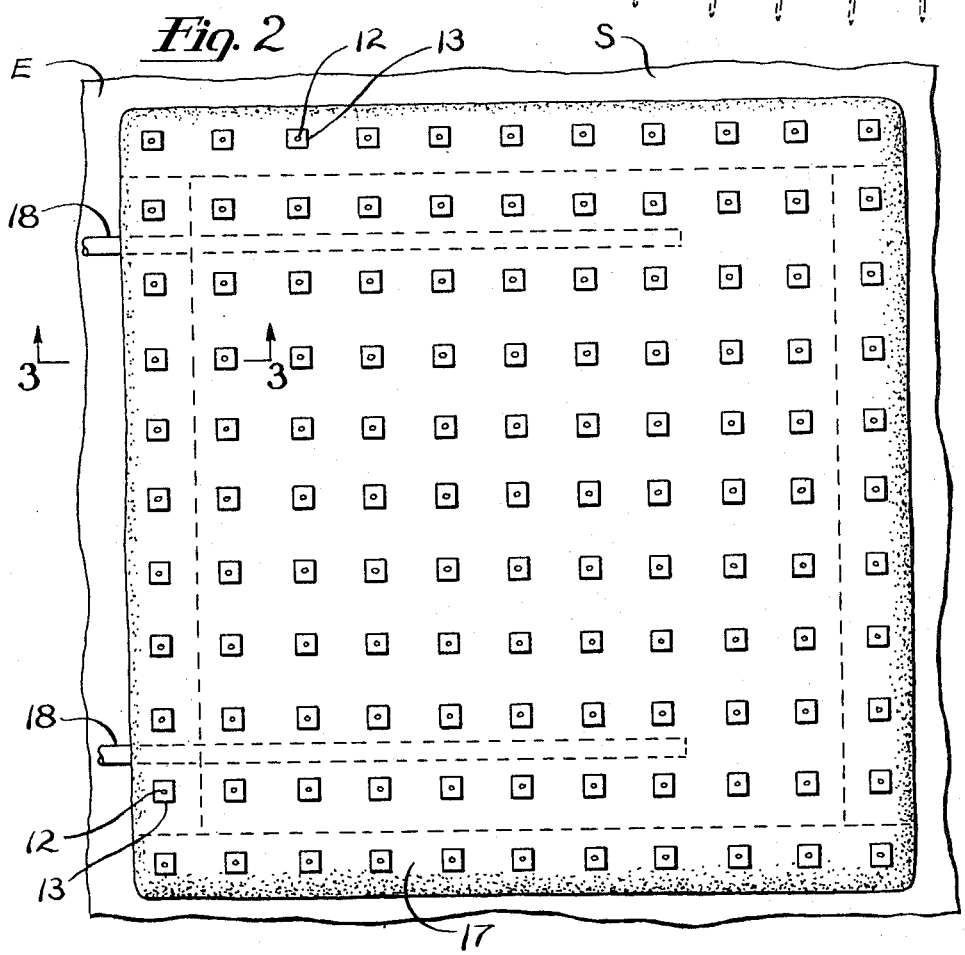
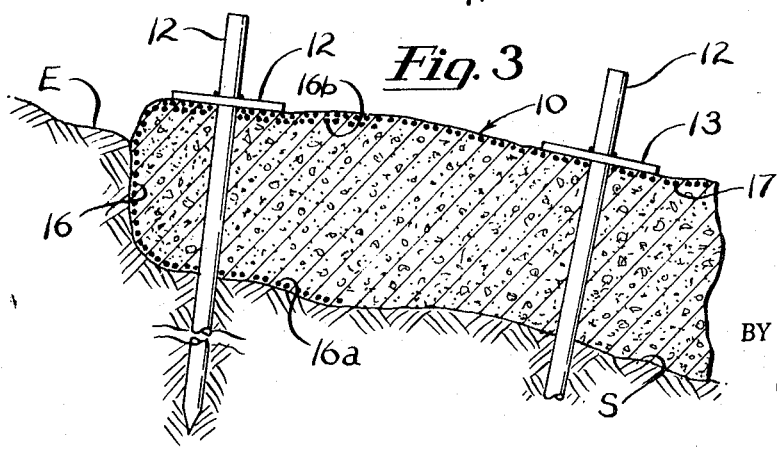
INVENTOR.
Lee A. Turzillo
BY
William Cleland
Attorney

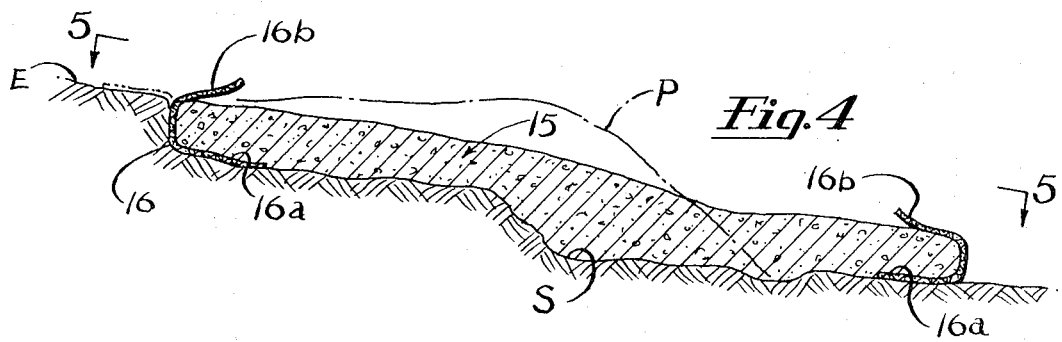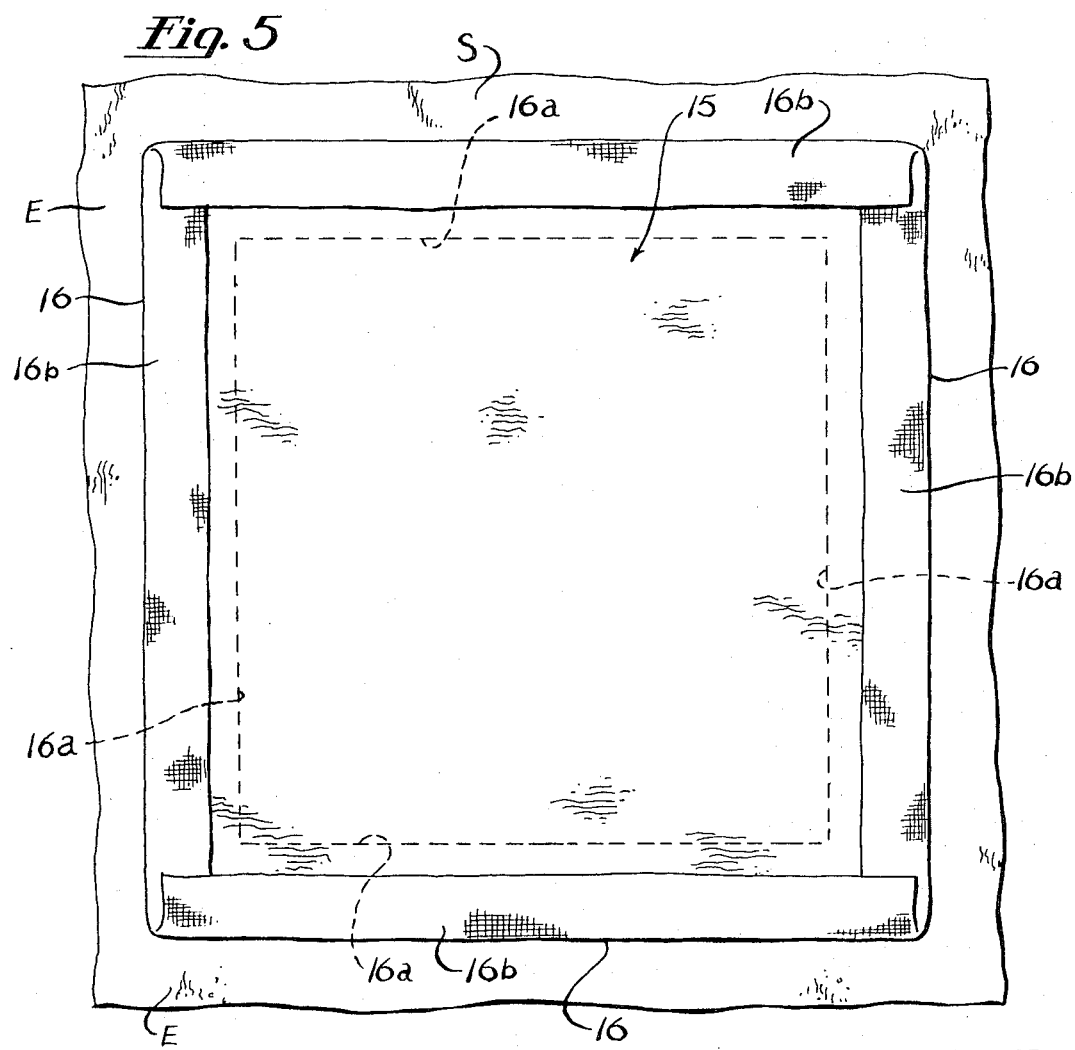

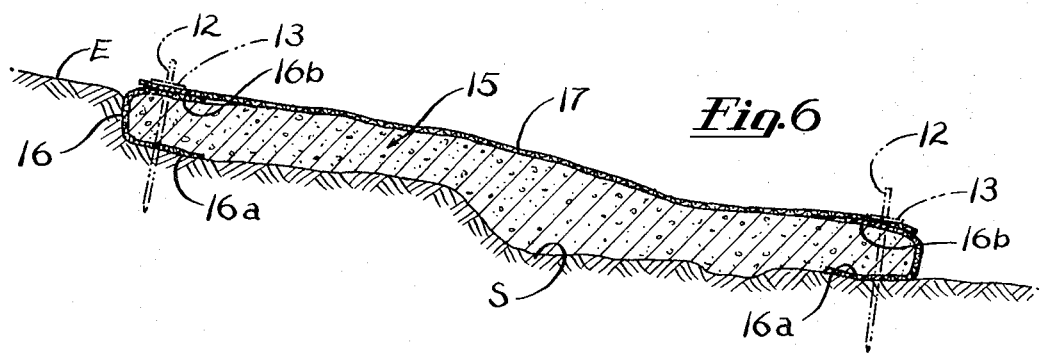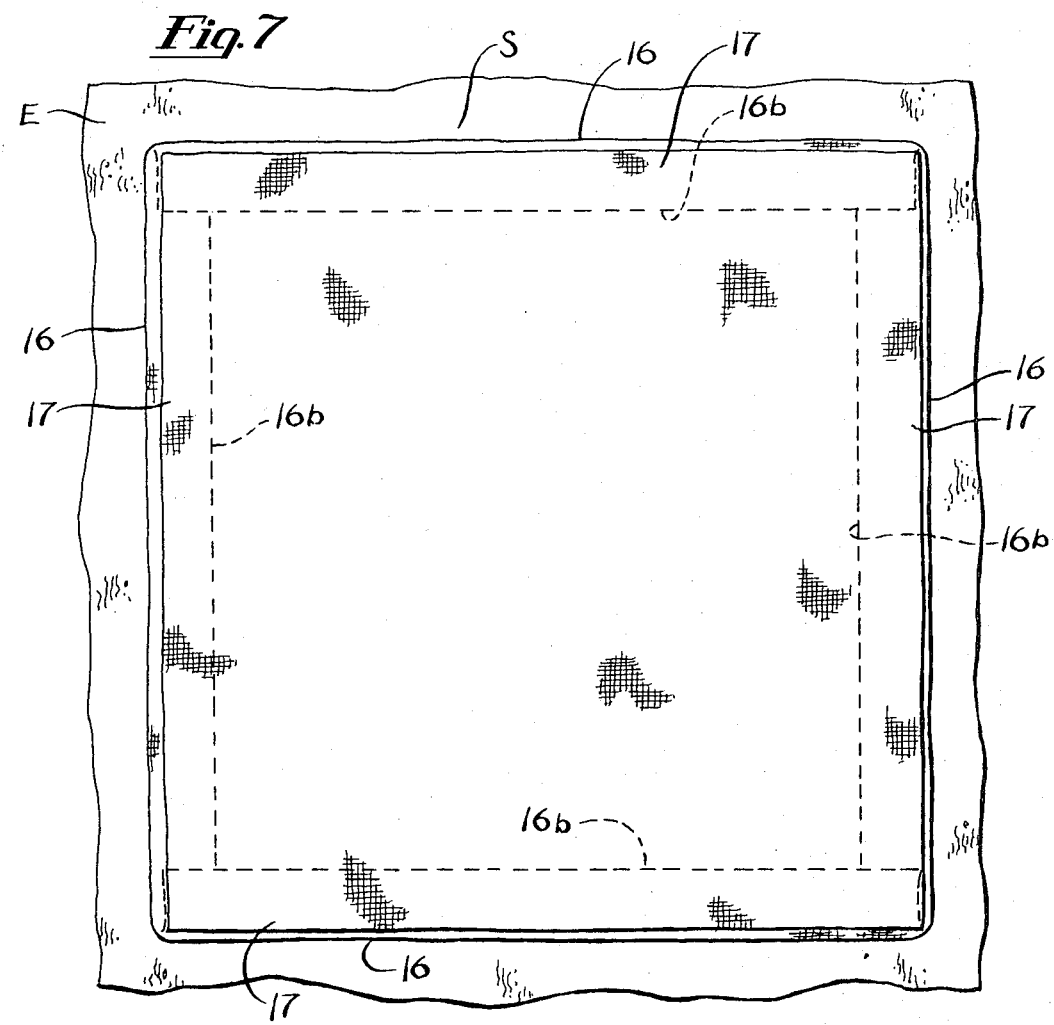

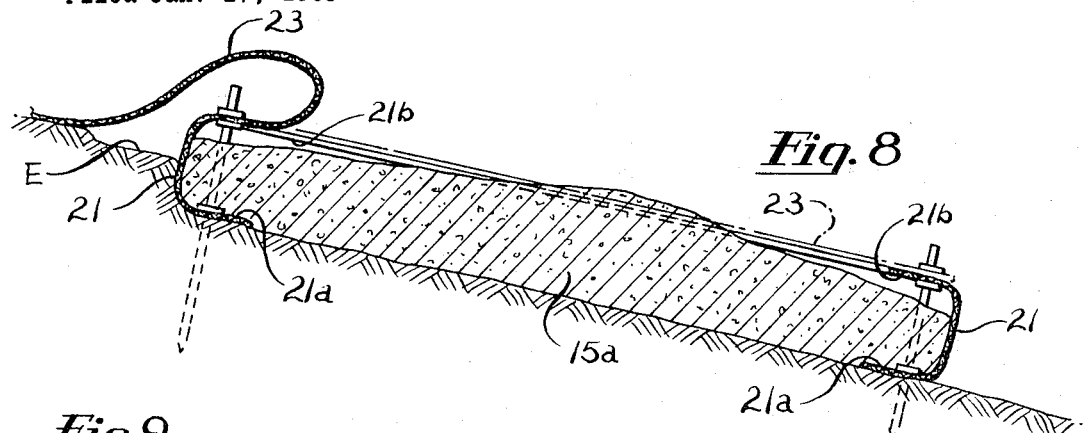
Fig. 8
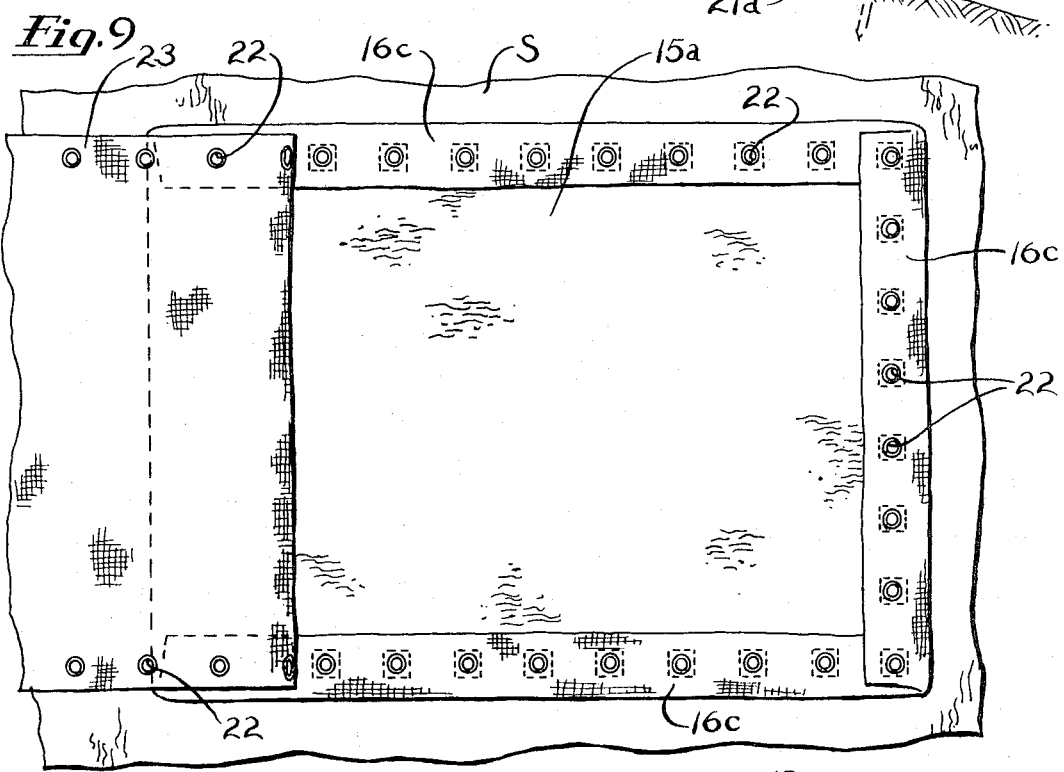
Fig. 9
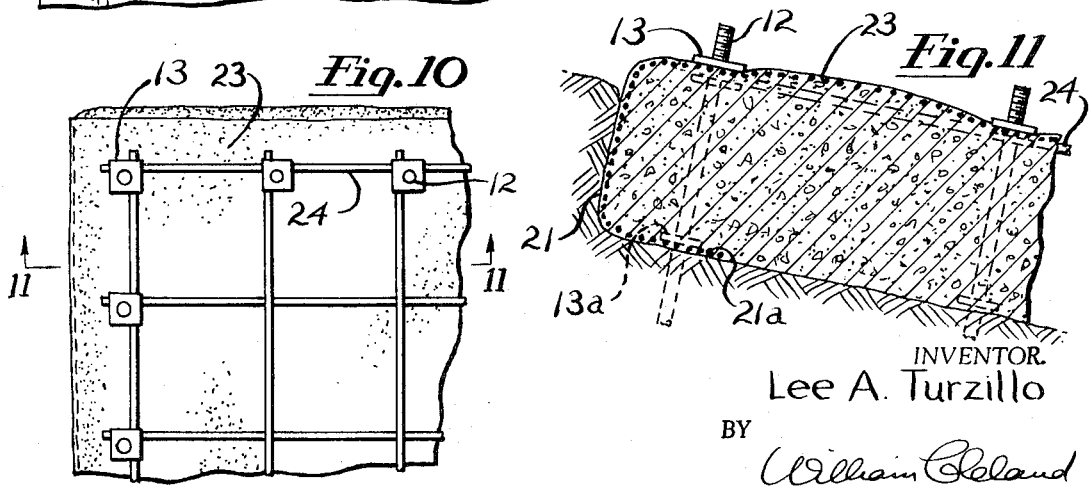
Fig. 10
Fig. 11
INVENTOR.
Lee A. Turzillo
BY
William C. Roland
Attorney

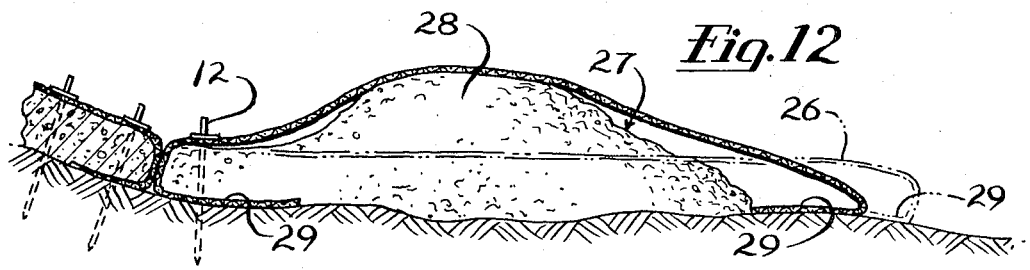
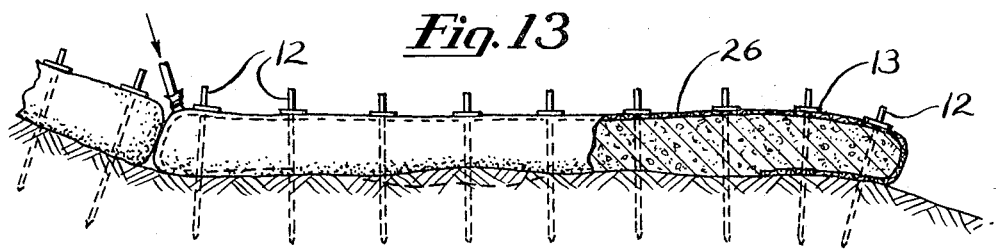
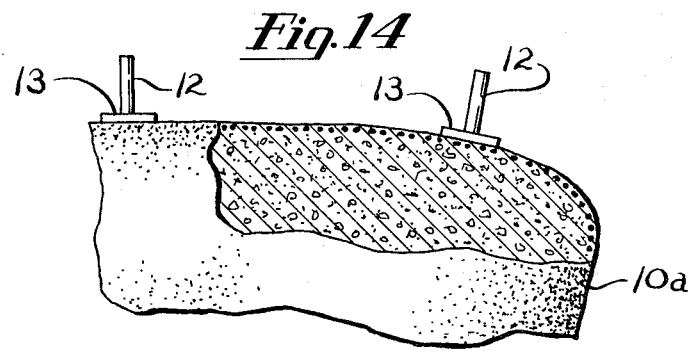
INVENTOR.
Lee A. Turzillo
BY
William Cleland
Attorney

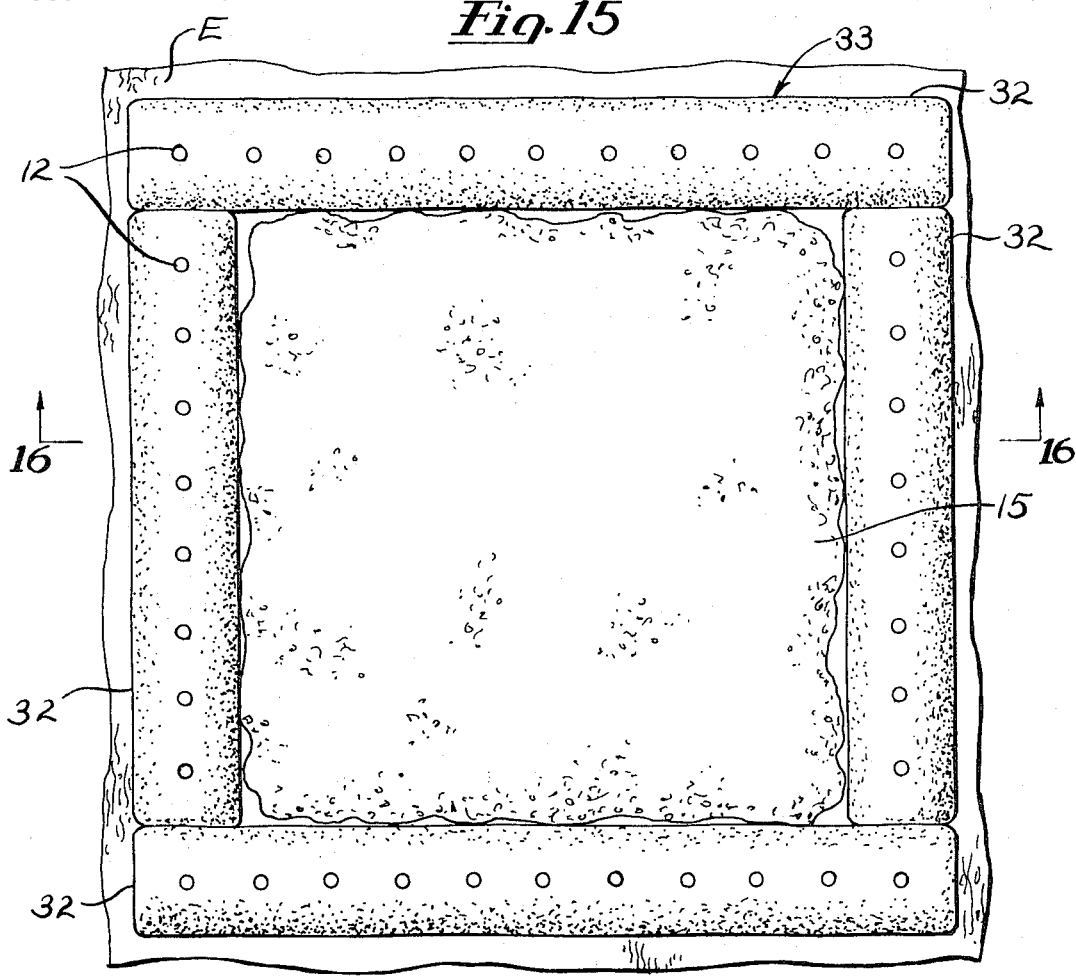
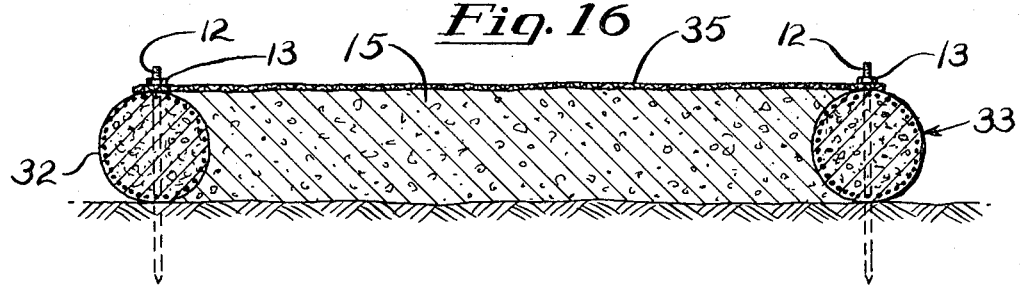
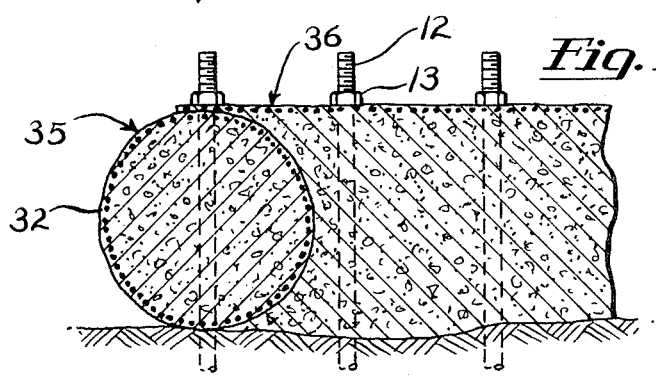

March 16, 1971 L. A. TURZILLO 3,570,254
METHOD AND MEANS FOR PROTECTING AN EARTH SURFACE AGAINST SCOUR
Filed Jan. 17, 1969 7 Sheets-Sheet 7
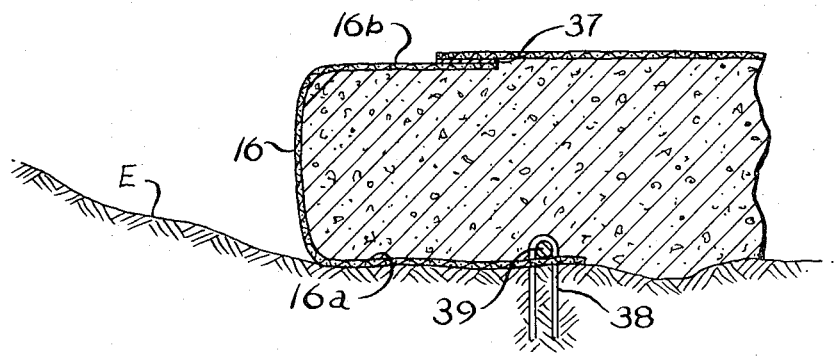
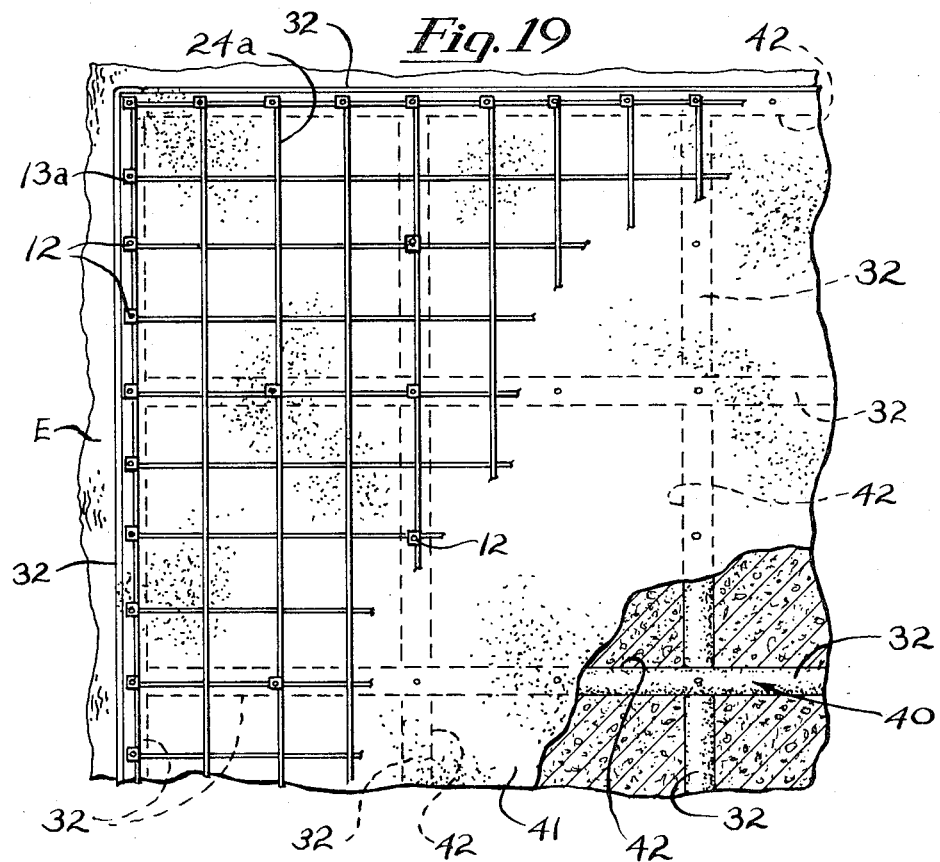
INVENTOR.
Lee A. Turzillo
BY
William Cleland
Attorney

United States Patent Office 3,570,254
Patented Mar. 16, 1971

3,570,254
METHOD AND MEANS FOR PROTECTING AN EARTH SURFACE AGAINST SCOUR
Lee A. Turzillo, 2078 Glengary Road, Bath, Ohio 44313
Filed Jan. 17, 1969, Ser. No. 792,175
Int. Cl. E02b *3/12*
U.S. Cl. 61—38          17 Claims

ABSTRACT OF THE DISCLOSURE

Method and means for forming protective liner body on an earth situs. Porous fabric formed and/or shaped in one of a number of ways as closed container about quantity of loose filler material, such as aggregate. Pressurized, hydraulic cement mortar pumped into formed container to permeate the filler material and expand anchoringly restrained container walls, until fluid mortar oozes through fabric pores. Fluid hardens into solid liner body with filler material discretely dispersed therein.

BACKGROUND OF INVENTION

Prior U.S. Pat. No. 3,383,864, discloses one method of protecting a scoured area of an earth situs by injection of fluid cement mortar or grout into a closed flexible fabric bag overlying the scoured area. Injection of the grout was continued while the bag means was formed to desired thickness, shape and size, and until a relatively small fraction of the fluid motar oozed through the fabric pores, after which it hardened into a solid body.

SUMMARY OF INVENTION

The present invention utilizes the same general principle as the aforesaid prior patent, but is for a method improvement which accomplishes highly satisfactory results at substantially reduced cost.

Briefly, in the various forms of the present invention, flexible porous fabric material or sheeting is formed or otherwise disposed as a closed container or bag means, of predetermined size, about a pile of aggregate or other loose filler material on the surface of the situs. This may be done, for example, by progressively anchoring marginal edge portions of the fabric with filler material from the pile, and manipulating the filler material and the fabric to provide a liner body of substantially the shape, size, and thickness required to protect a given surface area of the situs. At this point fluid hydraulic cement mortar is pumped under pressure into the interior of the formed body, first to permeate the filler material and then to expand the bag walls, against tensional restraint provided therein by suitable anchoring means.

By this method readily available filler material, from a source at or near the situs, is used to reduce the amount of grout mixture required in the prior method referred to, whereby the installation costs are substantially reduced.

One object of the invention is to produce a cast-in-place protective liner body at a situs, which utilizes loose economically obtainable filler material within cement mortar mix.

Another object of the invention is to provide an improved method for forming a protective liner body by which it is possible to vary the size, shape, and proportions of the liner body to suit varying conditions at the situs such as variations in contour.

Other objects of the invention will be manifest from the following brief description and the accompanying drawings.

Of the accompanying drawings:

FIG. 1 is a vertical cross-section through an earth situs, such as at water-eroded sloping bank of a stream or other body of water, and showing an edge view of a cast-in-place protective liner body, formed by one embodiment of the method of the invention.

FIG. 2 is a top plan view, on the same scale, of the cast-in-place liner body shown in full lines in FIG. 1.

FIG. 3 is an enlarged fragmentary cross-section, taken substantially on the line 3—3 of FIG. 2.

FIG. 4 is a view corresponding to FIG. 1, but as a cross-section through the liner body in an initial stage of production thereof by the method.

FIG. 5 is a top plan view taken substantially on the line 5—5 of FIG. 4.

FIGS. 6 and 7 are views corresponding to FIGS. 4 and 5, respectively, but illustrating an intermediate stage in the formation of the liner body.

FIGS. 8 and 9 are views corresponding to FIGS. 4 and 5, illustrating a modified method and means for producing a cast-in-place protective liner body.

FIG. 10 is an enlarged fragmentary top view of the completed protective liner body, produced by the method embodied in FIGS. 8 and 9.

FIG. 11 is an enlarged fragmentary cross-section, taken substantially on the line 11—11 of FIG. 10.

FIG. 12 is a cross-section corresponding to FIG. 8, but illustrating another method of producing a cast-in-place liner body, in an initial stage of formation thereof about a pile of loose filler material.

FIG. 13, corresponding to FIG. 12, is an edge view of the liner body, partly broken away and in section in an intermediate stage of formation thereof, prior to injection of a fluid cement mortar mix.

FIG. 14 is an enlarged fragmentary edge view taken at the right of FIG. 13, partly broken away and in section, and showing the completed stage of formation of the mortar-injected, cast-in-place liner body.

FIG. 15 is a top plan view, corresponding generally to FIG. 5, but illustrating an alternative method of forming a protective liner body, utilizing an outer rectangular frame formed of mortar inflated, closed bags.

FIG. 16 is a vertical cross-section taken on the line 16—16 of FIG. 15, but in an advanced stage in the method corresponding to FIG. 16.

FIG. 17 is an enlarged fragmentary cross-section as viewed at the left of FIG. 16, but showing a further advanced step in the alternative method, corresponding to FIG. 3.

FIG. 18 is a view corresponding to FIGS. 16 and 6, but illustrating the corresponding step in another alternative method of forming a protective liner body.

FIG. 19 is a reduced scale, fragmentary top plan view, partly broken away and in section, illustrating a cast-in-place liner body produced on a situs by a modified method which combines procedural steps of FIGS. 15 to 17 with the expansion of restraining means as shown in FIGS. 10 and 11.

Referring to FIGS. 1 to 3, there is illustrated a typical installation of a flat, rectangular cast-in-place liner body 10 produced by one form of the method of the present invention, on a slope S of an earth situs, such as the bank of a stream or like containment means for a body of water to be either above or below the water level. The liner body 10 may comprise rectangular bag means of porous fabric, such as woven burlap, nylon or other flexible woven material, containing a hardened concrete core or slab 11 conforming to the contour of the slope S, and being anchored to the situs by means of a plurality of relatively closely spaced spikes or stakes 12, 12 extended through the slab and into the earth E.

As best shown in FIG. 3, the concrete core 11 may be a composite of hardened hydraulic cement mortar integrally containing a substantial proportion of loose filler material, such as initially coarse aggregate through and about which the mortar has permeated. For highly satisfactory results, mortar which has extended through the pores of the fabric, in a manner to be described, provides a coating of hardened cement on the outer surface of the bag walls. Each stake 12 may have plate or collar 13 affixed thereon in stop engagement with the upper bag wall, for limiting expansion of the bag walls to determine the thickness and shape of the liner body 10.

For the method of producing the cast-in-place liner 10, shown in FIGS. 1 to 3, reference is made to FIGS. 4 to 7. Referring first to FIGS. 4 and 5, a quantity of readily obtainable filler material, such as a coarse aggregate 15, is placed in a pile P thereof, centrally of a given rectangular area to be covered by a liner body 10. A strip of porous fabric 16, of say three to four feet wide, is positioned on the slope around a rectangular perimeter, to have inner marginal portions 16a anchoringly weighted in place with portions of the loose aggregate. The outer portions 16b of the strip are now formed upwardly and inwardly, as shown in FIGS. 4 and 5, and the aggregate pile is leveled to an approximation of the desired variable thickness of the liner body 10. A square 17 of porous fabric, of about the same area as the liner body, is now positioned on top of the leveled and shaped aggregate to overlie the marginal portions 16b, and may be held in the relative position shown in FIGS. 6 and 7 by first projecting anchoring stakes 12 through the margins 16a and 16b, the aggregate layer between the same, and into the earth, until the stop plates or units 13 affixed thereon firmly engage against the marginal portions 16b, backed and anchored by the aggregate layer. Additional stakes 12 may then likewise be positioned in suitably closely spaced relationship around the outer margins of the formed liner body, as well as within the space inwardly thereof, as best shown in FIGS. 1 and 2.

The bag means, while maintained anchored and sealed as described, now may have hydraulic cement mortar pumped under pressure, through suitable conduit means 18 inserted through the bag means, first to permeate the loose aggregate 15, and then to inflate and expand the bag walls against restraint of the fixed stop plates 13 on the anchoring stakes, as well as against anchoring effect of the aggregate on the lower strip portions 16a. Pumping of the mortar may be continued until at least some of the mortar is exuded through the fabric pores, to assure efficient outward passage of water therethrough from the mortar mix, and thereby to attain effective setting and hardening of the concrete, whether above or below the water level at the slope S.

The method described has the advantage of providing close conformation of the aggregate and cement mortar combination to substantial irregularities in the earth slope S, in addition to the substantial economy of utilizing inexpensive, readily available aggregate with correspondingly lesser amounts of the usual cement mortar mix. Moreover, the method avoids the disadvantages of the use of prefabricated bags as well as the limitations of the fixed sizes thereof.

FIGS. 8 to 11 illustrate a method of making cast-in-place liner bodies substantially as described above for FIGS. 1 to 7, except that the upper marginal portions 21a of three next adjacent edge strip portions 21 are provided with prelocated grommets 22, for alignment of like grommets on a top bag wall 23, which is an integral extension of the fourth edge strip 21, after the bulk of the aggregate 15a has been supplied through the top opening defined by the marginal portions 16c. Anchoring of the bag means may be accomplished by stakes 12 extended through the aligned grommets, as shown in FIGS. 10 and 11, and by the inner area of the top wall 23 being restrained against expansion for the aforesaid mortar injection procedure, by a means of a strong wire-mesh grid 24 welded or otherwise secured to the marginal stakes 12.

In some instances it may be expedient or necessary to anchor the bottom marginal portions 21a of strip 21 to the surface of slope S more firmly than the weight of the aggregate alone could accomplish. Also, in some instances it may be more expedient to anchor the fabric portions 21a to suit before the aggregate is placed in the formed bag means. To this end the stakes 12 may be threaded rods with stop nuts 13 and 13a adjustably received thereon as shown in FIG. 11.

FIGS. 12 to 14 illustrate a further modified embodiment of the method and means of the invention, utilizing a single sheet of porous fabric 25, which is formed onto an open-bottomed, otherwise closed, bag or container 26. To this end the sheet 25 is formed over the top of a pile 27 of loose or coarse aggregate 28 and four marginal edges 29, 29 thereof are progressively anchoringly tucked under aggregate extended from the pile 27, while the pile is simultaneously worked to desired rectangular shape, thickness and size, as from the condition shown in FIG. 12 to that shown in FIG. 13. When the aggregate-filled bag means has been so formed and shaped the anchoring stakes 12 are projected therethrough and into the earth, as before. Fluid hydraulic cement mortar is then pumped into the aggregate, as before, to form the self-hardenable, cementitious liner body, generally as described above, and as shown in part in FIG. 14, wherein the hardened body 10a is functionally the same as that shown in FIGS. 1 to 3.

Referring to FIGS. 15 to 17, there is illustrated another modification of the invention, wherein elongated closed bags 32, 32, of porous fabric, such as burlap or other woven material, are positioned on surface S of the situs to form a rectangle, for example, and then are inflated in suitable sequence with hydraulic cement mortar, under pressure to be in tight engagement one with another at the junctures of adjoining bags. As before, for most effective results, a limited amount of mortar may be allowed to ooze through the pores to form a coating thereof on the outer surfaces of the bags. Anchoring stakes 12 may be driven through the mortar-filled bags 32, while the mortar therein is still penetrable. After the bags 32 have acquired full size and shape by said inflation procedure, the space within the resultant enclosing wall 33 may be filled with loose filler material 15, such as aggregate, and leveled to the requisite thickness, generally as shown in FIG. 16. A porous fabric cover 35 may be affixed on top of the resultant rigid wall 33, generally in the manner described in connection with FIGS. 1 to 3, like parts therefore being designated by like numerals unless otherwise noted. After the cover 35 is so affixed to the hardened or hardening frame 33, hydraulic cement mortar under pressure may be pumped into the loose aggregate 15 until it amalgamates with the same and the soil of the situs inwardly frame walls, and applies tensioning pressure to top fabric wall 35, as before, to provide a solid liner body 36 (see FIG. 17).

FIG. 18 shows a modification of the method and means described in connection with FIGS. 1 to 3, at the stage of the method exemplified in FIG. 6. FIG. 18, however, shows the top wall of the bag means attached to the top marginal portion 16b by means of suitable self-adhering sealing strips 37 of known type. Also, the lower marginal portion 16a, of formed fabric strip 16, may be anchored against the earth surface by anchoring staples 38, which are pressed over a peripherally extending metal wire 39, and anchoringly extended through strip portion 16a and into the earth.

FIG. 19 is a fragmentary top plan view corresponding to FIG. 10, but on a substantially reduced scale, and illustrates a variation of the method described to connection with FIGS. 15 to 17. That is, FIG. 19 shows inclusion of mortar-inflated bags 32, 32, utilized as exemplified in FIGS. 15, 16, and 17, to produce a unitary waffle-like, aggregate-retaining structure 40 over which a porous fabric wall 41 is anchoringly affixed generally as shown in FIGS. 10, 11, and 19. This is for the purpose of resisting inflation pressure applied to the corresponding areas of wall 41, upon pumping a hydraulic cement mortar into each cavity 42 of the waffle frame structure 40.

The FIG. 19 method and means is adapted for highly economical use, as for protecting very large surface areas of a situs against damage due to scour or erosion. The method and means of FIG. 19 would be economical, as compared with prior methods, for this purpose even under conditions calling for fluid cement mortar mix therein, without the aggregate 15.

It is readily apparent that the various methods and means of the invention described above suggest varying disclosed procedural steps in numerous other combinations within the contemplated scope of the invention. Other modifications therefore, may be resorted to without departing from the spirit of the invention or scope of the appended claims.

What is claimed is:

1. A method of providing a surface area of an earth situs with a protective lining, comprising: positioning container means upon a substantially broad lateral extent of the surface area with loose filler material contained within a peripheral wall of the container means, and with top wall means of porous fabric secured to said peripheral wall; injecting flowable self-hardenable cementitious fluid under pressure within the confines of the container means to permeate the filler material and expand said top wall means; and permitting said cementitious fluid to harden within the container means with said filler material incorporated therein.

2. A method as in claim 1, wherein said peripheral wall is provided by injecting self-hardenable cementitious fluid under pressure within closed, peripherally extending porous fabric bag means to expand the same.

3. A method as in claim 2, said container means including additional expanded porous fabric bags cooperating with each other and the expanded peripheral wall to divide said surface area into a plurality of smaller areas containing said filler material and cementitious fluid.

4. A method as in claim 3, said expansion of the top wall means being restrained by a relatively fixed openwork matrix.

5. A method as in claim 1, said expansion of the top wall means being restrained by a relatively fixed openwork matrix.

6. A method as in claim 1, wherein said cementitious fluid includes hydraulic cement mortar pumped under pressure into loose filler material within the container means.

7. A method of providing surface areas of an earth situs with protective lining, comprising: positioning flexible-walled container means upon a substantially broad lateral extent of the surface area, with loose filler material contained thereby, to have at least portions of the filler material anchoringly weighting down underlying portions of the container means against the earth situs; injecting flowable self-hardenable cementitious fluid under pressure within the confines of the container means to permeate the filler material and expand the walls of the container means; and permitting said fluid to harden as a solid liner body with said filler material incorporated therein.

8. A method as in claim 7, wherein expansion of said walls is selectively restrained to control the shape of the liner body.

9. A method as in claim 8, wherein flexible wall portions of said container means are of porous fabric, and injection of said fluid is continued until a small fraction thereof has oozed through the pores of the fabric.

10. A method as in claim 9, wherein said expansion is restrained by a plurality of tie-elements positioned through the container means and anchored in the earth situs.

11. A method as in claim 7, wherein expansion of said walls is restrained by a plurality of tie-elements positioned through the container means and anchored in the earth situs.

12. A method of providing surface areas of an earth situs with protective lining, comprising: forming flexible porous fabric material into a closed container about a quantity of loose filler material on the surface area substantially to predetermined shape of protective liner; injecting self-hardenable cementitious fluid under pressure into the formed liner body to permeate the loose filler material and expand the walls of the liner body; and permitting said fluid to harden as a solid liner body with said filler material incorporated therein.

13. A method as in claim 12, wherein expansion of said walls is selectively restrained at a plurality of points to determine formed shape of the liner body.

14. A method as in claim 13, wherein injection of said fluid is continued until a small fraction of the same has oozed through the pores of the fabric.

15. A method as in claim 7, wherein said wall expansion is restrained by restraining means on a plurality of anchoring stakes projected through the positioned container, including underlying portions thereof, and anchoringly into the situs.

16. A method as in claim 15, said restraining means including spaced adjustable stop means thereon for restraining engagement with correspondingly spaced portions of the positioned container.

17. A method as in claim 15, said restraining means including an openwork matrix anchored to a plurality of said stakes for restraining engagement with the top wall of said flexible-walled container.

References Cited
UNITED STATES PATENTS

| | | | |
|---|---|---|---|
| 360,225 | 3/1887 | Kanters | 61—38 |
| 841,281 | 1/1907 | Thorne | 61—38 |
| 1,039,579 | 9/1912 | Neames | 61—38 |
| 3,383,864 | 5/1968 | Turzillo | 61—38 |
| 3,396,542 | 8/1968 | Lamberton | 61—38 |
| 3,425,227 | 2/1969 | Hillen | 61—38 |

DAVID J. WILLIAMOWSKY, Primary Examiner

P. C. KANNAN, Assistant Examiner